United States Patent [19]

Fredericksen et al.

[11] Patent Number: 4,577,911
[45] Date of Patent: Mar. 25, 1986

[54] OSCILLATING BEARING

[75] Inventors: Arnold E. Fredericksen, Colebrook; Robert D. Richtmeyer, Goshen, both of Conn.

[73] Assignee: The Torrington Company, Torrington, Conn.

[21] Appl. No.: 780,281

[22] Filed: Sep. 26, 1985

[51] Int. Cl.⁴ .............................................. F16C 11/00
[52] U.S. Cl. ................................................... 308/2 R
[58] Field of Search .............. 308/2 R; 384/154, 155, 384/156, 575, 580; 123/90.41

[56] References Cited

U.S. PATENT DOCUMENTS

| | | | |
|---|---|---|---|
| 2,805,108 | 9/1957 | Palmgren | 384/580 |
| 3,729,239 | 4/1973 | Camosso | 384/575 |
| 4,029,367 | 6/1977 | Schwede et al. | 308/2 R |
| 4,314,732 | 2/1982 | Murphy | 308/2 R |

Primary Examiner—Lenard A. Footland
Attorney, Agent, or Firm—F. S. Troidl

[57] ABSTRACT

The oscillating bearing has an arcuate inner raceway, an arcuate outer raceway, and an arcuate retainer between the raceways. The raceways and retainer have aligned openings for receiving a stud. On each side of the retainer opening the retainer has a pair of arcuate roller pockets extending in the oscillating direction and longitudinally spaced from the retainer opening. A roller is located in each roller pocket.

2 Claims, 5 Drawing Figures

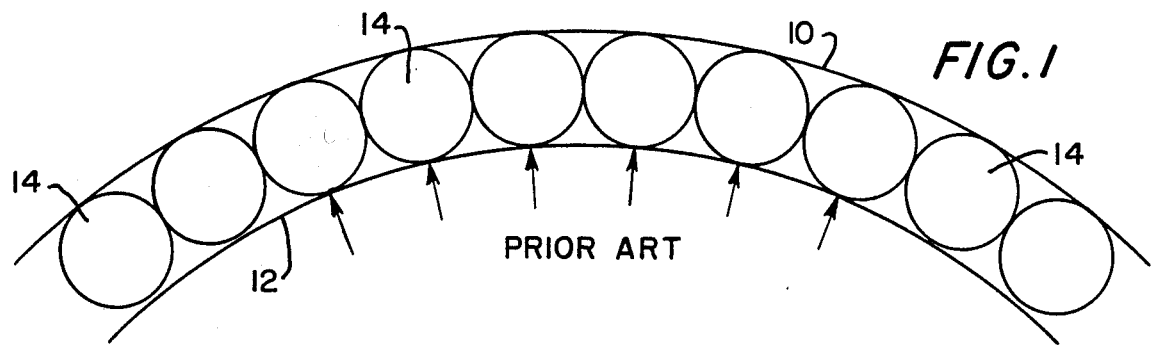
FIG. 1 PRIOR ART
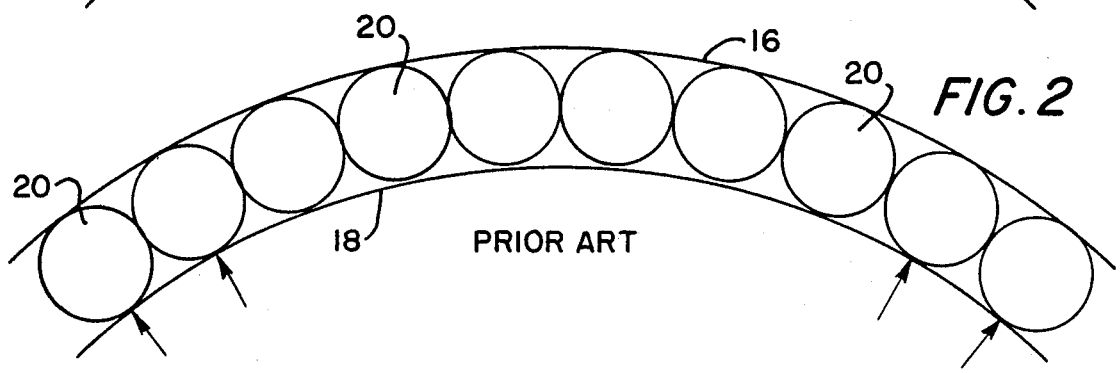
FIG. 2 PRIOR ART
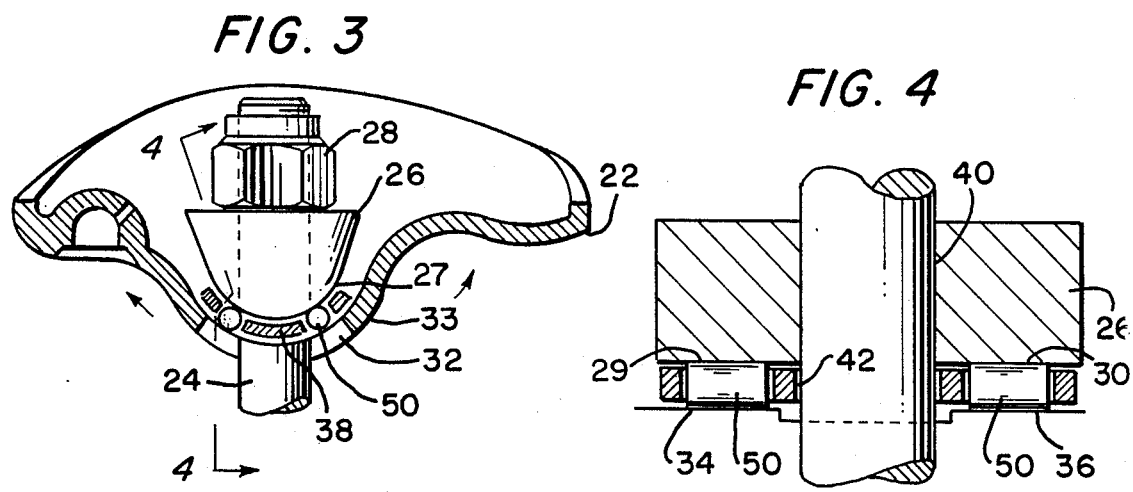
FIG. 3
FIG. 4
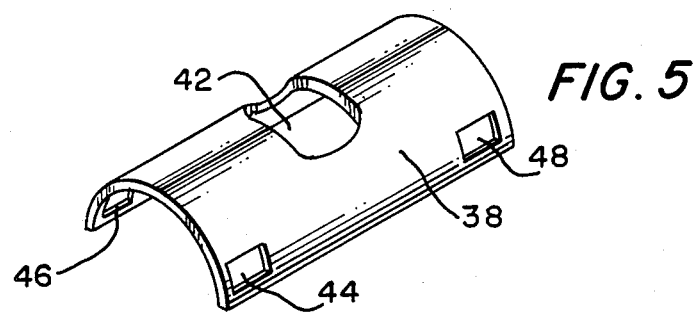
FIG. 5

OSCILLATING BEARING

This invention relates to oscillating anti-friction bearings. More particularly, this invention is an oscillating bearing for a stud mount and can also be used with a rocker shaft mounting.

The oscillating bearing to be described herein uses only the arcuate bearing surfaces necessary to handle an oscillating mechanism rather than the conventional complete 360° radial bearing. One particular use of this new oscillating bearing is with valve train rocker arms used on internal combustion engines.

Conventional oscillating bearings for use with valve train rocker arms include a pair of arcuate pockets extending in the oscillating direction. The pockets are each long enough in the oscillating direction to receive a plurality of rollers. An example of such a conventional oscillating bearing is shown in the U.S. Pat. No. 4,314,732 issued Feb. 9, 1982 in the name of William W. Murphy and entitled "Oscillating Bearing". The oscillating bearing described in this patent works quite well when the manufacturer is willing to incur the costs involved in controlling the tolerances on the geometry of the inner race and outer race to very low tolerances. When it is difficult to control the radii of the inner and outer race surfaces, the life of a bearing containing a plurality of rollers per raceway path can be greatly reduced by the poor conformance of the inner and outer raceways to the bearing rollers.

The oscillating bearings of this invention is insensitive to non-conformance inner and outer raceway radii. Thus, this bearing may be used where the tolerances on the geometry of the radius of the inner race and/or outer race are poor. Therefore, the manufacturer need not incur the expense involved in efforts to control the radii of the inner raceways and outer raceways to very low tolerances.

Briefly described, the oscillating bearing comprises arcuate inner raceway means, arcuate outer raceway means, and an arcuate retainer between the inner raceway means and the outer raceway means. The inner raceway means, the outer raceway means, and the retainer have aligned openings for receiving a stud. The retainer has two pairs of arcuate roller pockets, one pair of pockets being axially spaced from the retainer opening in one direction, the other pair of pockets being axially spaced from the retainer opening in the other direction. One pocket of each pair of pockets is spaced in the oscillating direction on the opposite side the retainer opening from the other pocket. A single roller is located in each pocket.

The invention as well as its many advantages, may be further understood by reference to the following detailed description and drawings in which:

FIG. 1 is a schematic view illustrating the results of the effects on a prior art bearing with an outer raceway with a radius which is too large with respect to the inner raceway radius;

FIG. 2 is a sketch illustrating the results in the prior art oscillating bearing when the outer raceway radius is too small with respect to the inner raceway radius;

FIG. 3 is a side elevational view, partly in section, showing a preferred embodiment of the oscillating bearing used with a rocker arm;

FIG. 4 is a view, partly in section, taken generally along lines 4—4 of FIG. 3; and FIG. 5 is a perspective view of the retainer of the preferred embodiment.

In the various figures like parts are referred to by like numbers.

Referring to the drawings and more particularly to FIG. 1, the prior art outer raceway 10 has a radius which is too large with respect to the radius of the inner raceway 12. This causes only a few of the rollers 14, which are located toward the center of the roller path, to carry the load. The rollers which carry the load are indicated by the arrows; the rest of the rollers, as can be seen, do not carry the load.

FIG. 2 illustrates what happens with conventional prior art oscillating bearings when the radius of the outer raceway 16 is too small relative to the radius of the inner raceway 18. In such case, only the outermost rollers 20 will carry the load. The rollers which carry the load are illustrated by the arrows in FIG. 2.

Referring to FIG. 3. An automobile engine valve train rocker arm 22 is shown mounted on a stud 24 for oscillatory movement in the direction of the arrows. The stud 24 extends through a bore formed through the stud support 26 which is firmly secured in place by means of nut 28. The stud support 26 has an arcuate race 27 with spaced apart arcuate inner raceways 29 and 30 (see FIG. 3 and FIG. 4) for the rollers contained in the retainer. The stud 24 extends through an opening 32 extending through the bottom of the rocker arm 22 and is usually threaded in place.

The bottom part of the rocker arm 22 is arcuately shaped at 33 to provide an arcuate race with raceways 34 and 36 (see FIGS. 3 and 4).

An arcuate retainer 38 is located between the arcuate surface of the stud support 26 and the arcuate surface of the rocker arm 22. The stud opening 40 in the stud support 26 is aligned with opening 42 in retainer 38 and opening 32 in the rocker arm 22.

As shown in FIG. 5, the retainer 38 has two pairs of arcuate roller pockets with one pair of pockets being axially spaced from the retainer opening 42 in one direction and the other pair of pockets being axially spaced from the retainer opening 42 in the other direction. The pocket 44 is spaced in the oscillating direction on the opposite side of the retainer opening 42 from the other pocket 46. The pocket 48 in the other pair of pockets is likewise spaced in the oscillating direction on the opposite side of the retainer opening 42 from the other pocket (not shown) of this pair of pockets. A single roller 50 (see FIG. 3 and FIG. 4) is received in each pocket.

In operation, as the rocker arm 22 oscillates relative to the stud 24, the stud support 26 remains fixed, the retainer 38 oscillates through a predetermined angle of say about 15°, in the direction of oscillation, and the rocker arm 22 oscillates through a greater predetermined angle of say about 30°. Thus, stud opening 42 in the retainer 38 is longer in the oscillating direction than the stud opening 40 in the stud support 26, and the stud opening 32 in the rocker arm 22 is longer in the oscillating direction than the stud opening 42 in retainer 38.

With the four roller and four roller pocket arrangement of this bearing, the inner raceways and outer raceways will always contact the four rollers regardless of how much out of conformity the radius of the inner race and the radius of the outer race may have, barring gross axial raceway variations.

It may be that for certain particular applications it is necessary or desirable to use a separate arcuate inner race attached to the arcuate surface of stud support 26 and/or use a separate outer race attached to the arcuate surface of the rocker arm 22. As used in the appended claims, the language "raceway means" is meant to include not only the use of the stud support 26 directly and the use of the surfaces on the rocker arm 22 directly as the raceways but also to include the use of separate arcuate inner and outer races attached to the stud support 26 and rocker arm 22, respectively.

We claim:

1. An oscillating bearing comprising: arcuate inner raceway means; arcuate outer raceway means; and an arcuate retainer between said inner raceway means and said outer raceway means, the inner raceway means, the outer raceway means and the retainer having aligned openings for receiving a stud, said retainer having two pairs of arcuate roller pockets, one pair of pockets being axially spaced from the retainer opening in one direction, the other pair of pockets being axially spaced from the retainer opening in the other direction, one pocket of each pair being spaced in the oscillating direction on the opposite side of the retainer opening from the other pocket; and a single roller in each pocket.

2. An oscillating bearing in accordance with claim 1 wherein: the arcuate inner raceway means is a stud support having an arcuate surface providing the inner raceways; and the arcuate outer raceway means is a rocker arm having arcuate surfaces providing the outer raceways.

* * * * *